Inventors
Hans Hacklander
John A. Herr
By William P. Stewart
Attorney

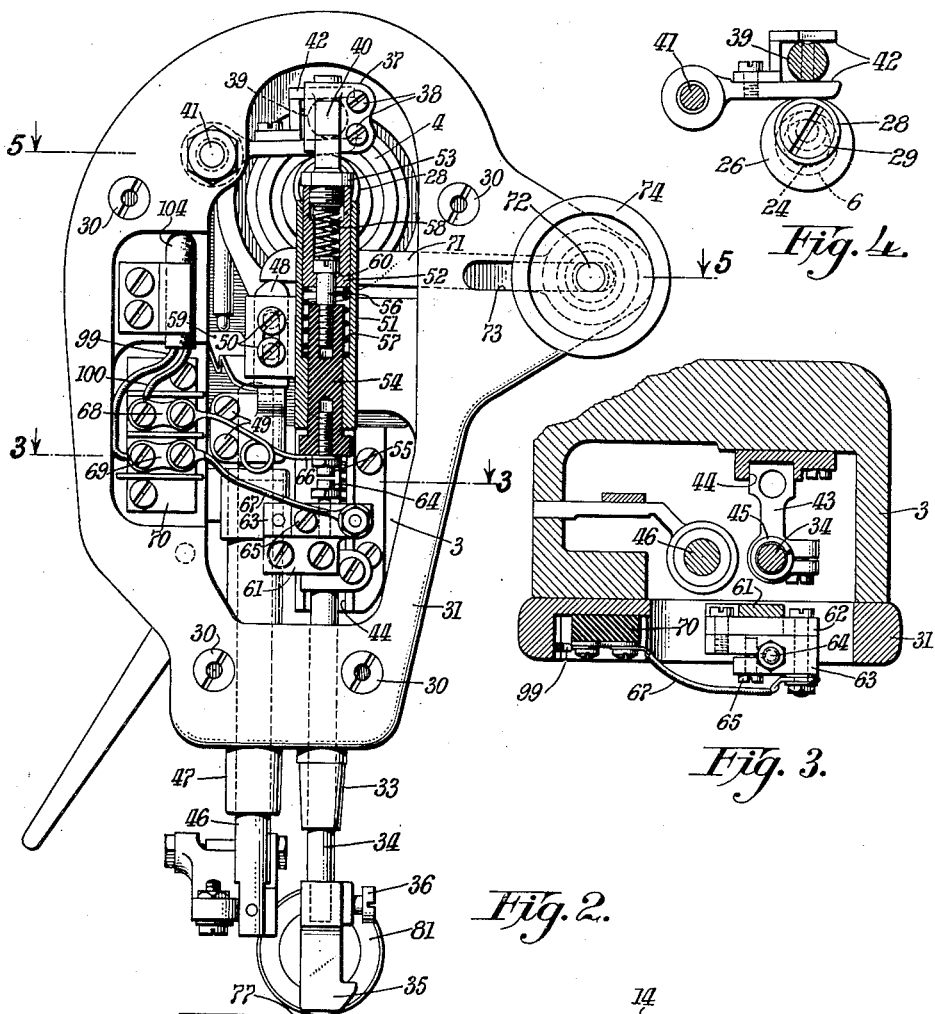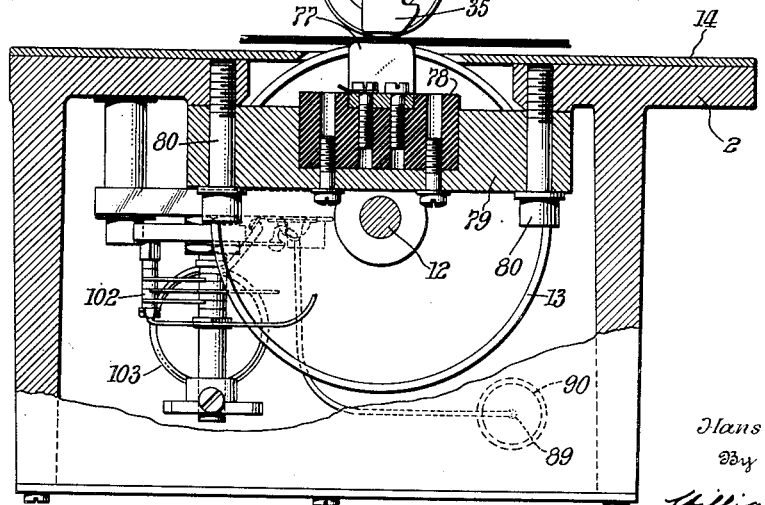

Patented Apr. 7, 1953

2,634,363

UNITED STATES PATENT OFFICE 2,634,363

BONDING MACHINE WITH AUTOMATIC ELECTRODE PENETRATION AND OSCILLATOR KEYING CONTROL

Hans Hacklander, Linden, and John A. Herr, Hillside, N. J., assignors to The Singer Manufacturing Company, Elizabeth, N. J., a corporation of New Jersey Application September 2, 1948, Serial No. 47,356

17 Claims. (Cl. 219—47)

This invention relates to machines for bonding together plies of dielectric material by the use of radio-frequency fields. More particularly, it relates to control means for bonding machines or seaming machines of this type.

Heretofore, in bonding machines employing reciprocatory electrodes, the voltage gradient in the air gap formed when the electrode is raised out of the work to permit feeding thereof may be several times that in the work material itself. This may result in electrical breakdown of the air, producing arcing, burning and sometimes even puncture of the work material. This condition appears to be due to the fact that the work materials usually employed invariably have a dielectric constant considerably higher than air; in some cases, several times as much.

Difficulty has been also experienced in maintaining a uniform bond when substantial variations in the thickness of the material to be bonded are encountered, due to the change in the radio-frequency power requirements occasioned by the thickness change. Previous attempts to correct this difficulty have been made by changing the feed rate and the frequency or the magnitude of the radio-frequency field itself.

It is an object of this invention, therefore, to provide a bonding machine in which the oscillator thereof is turned off and on so that the radio-frequency field is effective only when the electrode is in the work material, i. e., when there are no air gaps between the electrodes and the work.

A further object of this invention is to provide a control system for the oscillator associated with a bonding machine whereby the oscillator is turned on and off in timed relation with the electrode reciprocations.

A still further object of this invention is to provide a control for the oscillator of a bonding machine whereby the time during which the oscillator is turned on per bonding cycle is dependent on the thickness of the material being bonded.

Another object of this invention is to provide, in conjunction with said oscillator control, means for limiting the penetration of the electrode into the work according to the thickness of the material being bonded.

These objects are attained by employing a thickness sensing device, preferably in the form of a roller presser, which continually determines the thickness of the material in contact with it. In accordance with the thickness so sensed, the pressure adjusts a mechanical stop for the electrode in order to provide the proper penetration into the work and, at the same time, said presser adjusts a switch in relation to its operating cycle, as determined by an armshaft eccentric, so that said switch is opened and closed at the proper points in the cycle to establish the correct bonding time.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings:

Fig. 2 is a front end elevation partly in section, of the machine of Fig. 1 with the cover plate removed.

Fig. 3 is a horizontal section of the bracket-arm head and taken on the line 3—3 of Fig. 2.

Fig. 4 is a sectional detail, partly in elevation, taken on line 4—4 of Fig. 1.

Figure 1:
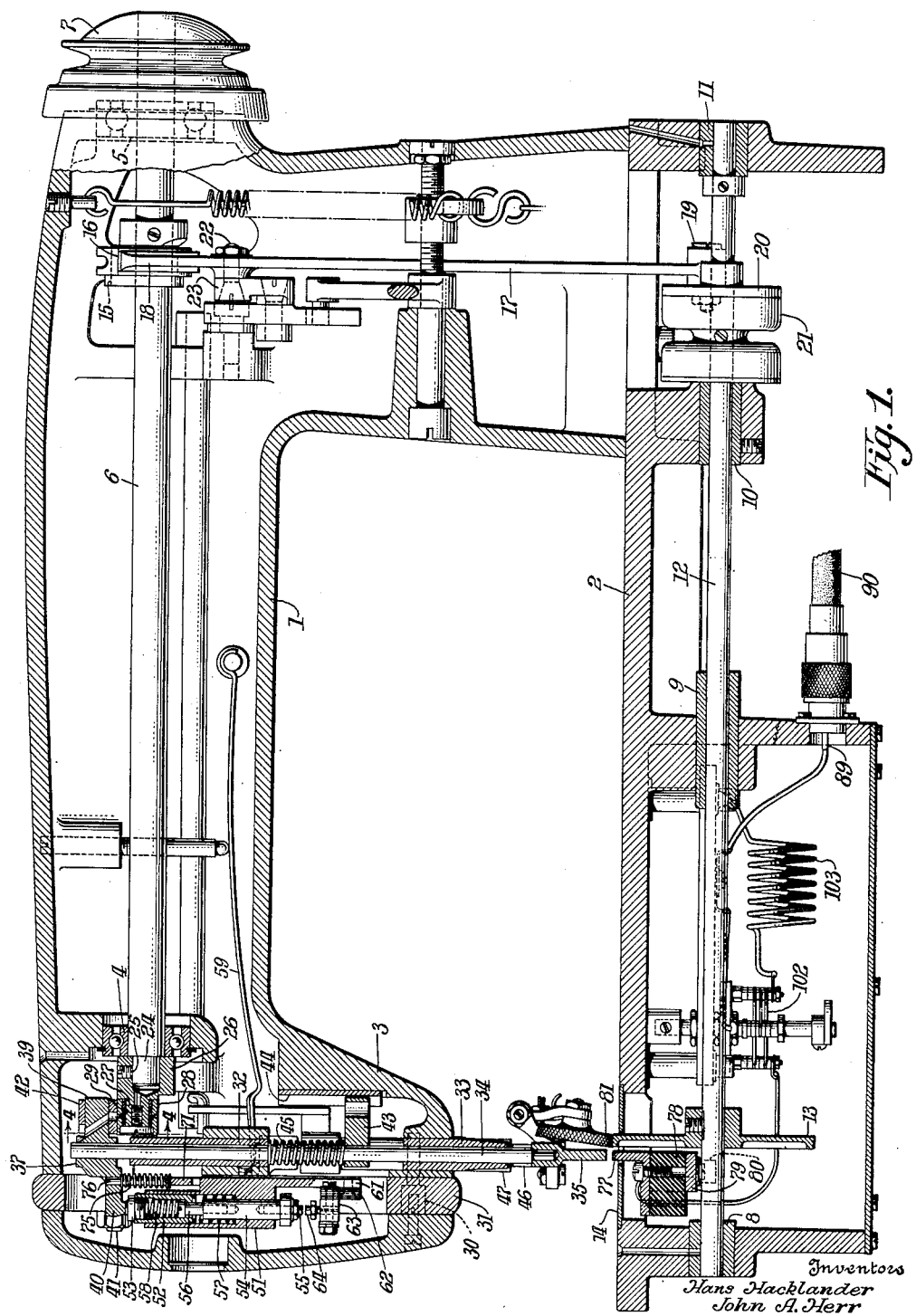
Fig. 1 is a longitudinal section taken through a bonding machine embodying the invention.

Referring now to Fig. 1, 1 represents an overhanging bracket-arm of a bonding machine of the general type shown and described in the U. S. Patent No. 2,432,412 of December 9, 1947, to which reference may be had for a detailed description of the parts not fully disclosed herein. A bed 2 carries the overhanging arm 1 which terminates in a hollow head 3. Journaled in bearings 4 and 5 in the bracket-arm 1 is a main shaft 6 having a combined pulley and hand-wheel 7 secured to its outboard end. The pulley 7 may be connected by any suitable means to a source of power for the purpose of rotating the shaft 6. Journaled beneath the bed 2 in bearings 8, 9, 10 and 11 is a second shaft 12 arranged parallel with the main shaft 6, and secured to the shaft 12 intermediate the bearings 8 and 9 is a feed wheel 13, the periphery of which extends through a suitable slot in a plate 14 carried by the bed 2.

The rotary shaft 6 imparts intermittent step by step rotary movement to the shaft 12 through mechanism comprising an eccentric 15 secured upon the main shaft 6, a block 16 surrounding the eccentric, and a connecting rod 17 having its upper forked end 18 engaging the sides of the block 16 and its lower end pivotally connected, at 19, to a laterally extending arm 20 of a one way clutch 21 which is secured upon the shaft 12 intermediate the bearings 10 and 11.

Adjacent its upper end, the connecting rod 17 has pivotally connected to it, at 22, one end of an anchor link 23, which is adjustably supported so that the amount of angular movement imparted to the shaft 12 and feed wheel 13 for each rotation of the main shaft 6, may be varied, as is clearly explained and set forth in the aforementioned patent.

Secured to a reduced terminal portion 24 of the shaft 6 by means of set screws 25 is a hub 26 carrying an eccentric pin 27 on which a roller 28 is mounted and retained thereon by means of a tap screw 29.

Secured to the bracket-arm head 3, by means of screws 30, is an extension housing 31 which provides additional space within the arm for the mechanism about to be described. Also secured in the head 3 are bushings 32 and 33 within which is journaled an electrode bar 34 for vertical reciprocation. An electrode or bonding foot 35 is secured to the lower end of the electrode bar 34 by means of a clamp screw 36. A cross-head 37, clamped to the upper end of the electrode bar 34 by means of screws 38, is formed with a cylindrical hub portion 39 and a depending finger portion 40.

A pivot screw 41 is secured to the housing 31 and forms an axis about which a strap 42 may rotate. As illustrated in Fig. 4, the strap 42 embraces the cylindrical hub 39 and rides up and down urged by the roller 28, thus transferring the rotary motion from the eccentric pin 27 to linear vertical motion of the electrode bar 34. As shown in Fig. 3, a guide-piece 43, secured to the electrode bar 34, engages a guideway 44, fixed in the head 3, and prevents turning of said electrode bar about its longitudinal axis. A spring 45 encompasses the electrode bar 34 and is held compressed between the guide-piece 43 and the bushing 32, thus to provide a downward bias force for the electrode bar.

A presser bar 46, biased downwardly by leaf spring 59, is journaled in a bushing 47 fixed in the head 3 and carries at its upper end an offset cam finger 48 secured thereto by means of screws 49. Secured to said cam finger for vertical adjustment thereupon and by means of screws 50, is a tubular switch assembly comprising an outer tubular casing 51, an inner sleeve member 52 carrying a cap 53, and a plunger 54 at the lower end of which is adjustably secured a contact 55. The plunger 54 also carries at its upper end a screw 56, the head of which is arranged to slide within the inner sleeve 52. Spring 57, positioned within the casing 51, exerts a biasing force, urging the sleeve 52 upward so that the cap 53 is maintained in engagement with the finger portion 40 of the cross-head 37. A second spring 58, positioned within the inner sleeve 52, exerts a biasing force urging the screw 56 downward against a shoulder 60 formed on the sleeve 52. The switch casing 51 is formed with a depending portion 61 to which is secured an insulation piece 62 carrying a split-plate 63 into which is threaded a lower contact 64 positioned in cooperative relation with the upper contact 55. A lock-screw 65 is employed to fix the adjustment of the contact 64 made by screwing same into and out of the insulated split-plate 63. Flexible conductors 66 and 67 connect the contacts 55 and 64 with terminals 68 and 69 of an insulated terminal block 70 secured to the housing 31.

Figure 5:
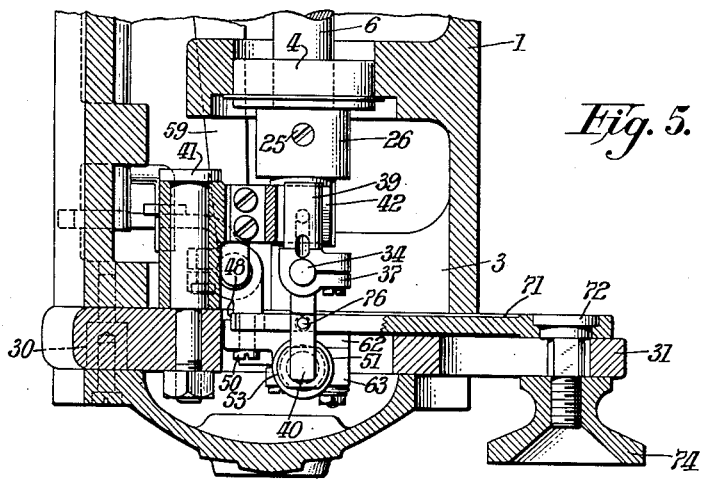
Fig. 5 is a section of the bracket-arm, partly in plan, taken on line 5—5 of Fig. 2.

As seen best in Fig. 5, a stop-arm 71 is pivoted about a pivot screw 72, positioned in a slot 73 in the extension housing 31, and secured therein by means of a hand-nut 74. The free end of said arm 71 rests upon the upper extremity of the cam finger 48 and is maintained in contact therewith by means of a spring 75 which encompasses a pin 76 secured to the cross head 37. The descent of the electrode bar stops when the end of the pin 76 engages the arm 71, and the electrode bar remains in this position until the eccentric pin 27 exerts a lifting force upon the cross-head.

It will be seen that the vertical displacement of the arm 71 at the stop pin is a definite fraction or percentage of the actual vertical displacement of the presser bar due to the thickness changes. The actual percentage displacement is controlled by selecting the proper pivot point for the arm by moving the pivot screw 72 in the slot 73.

Cooperating with the reciprocatory electrode 35 is a lower stationary electrode 77 fixed in a block 78 of high-frequency insulating material. The block 78 is secured to a bridging strap 79 which is fastened to the bed portion 2 of the machine by means of screws 80. The presser bar 46 carries at its lower end a roller presser 81 which cooperates with the feed wheel 13, driven, by the shaft 12, to progressively feed material therebetween.

Figure 6:
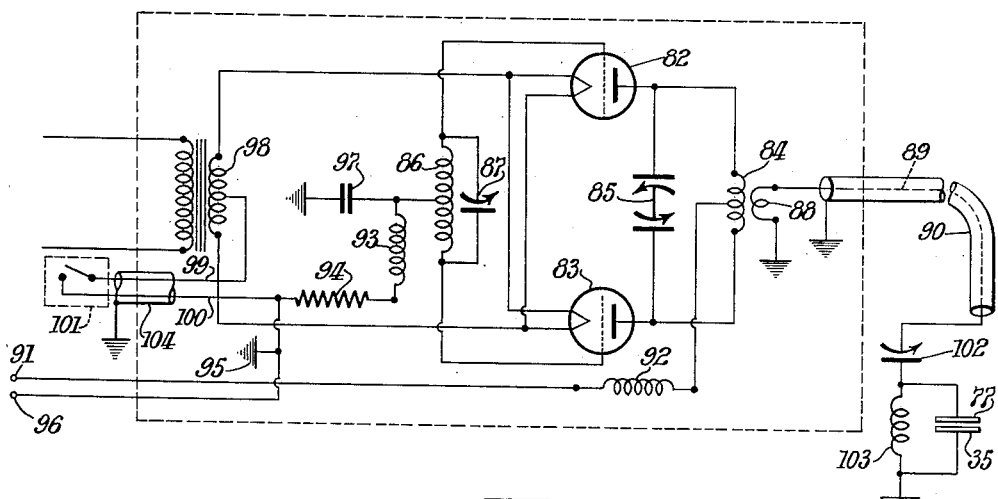
Fig. 6 is a schematic diagram showing the electrical connections between a keying switch and and oscillator.

Referring to the schematic diagram of Fig. 6, a preferred form of the oscillator comprises two triodes, 82 and 83, connected in a conventional push-pull tuned-plate, tuned-grid circuit. A plate tank coil 84 is tuned by condenser 85, and a grid tank coil 86 is tuned by condenser 87. Coupled to the plate coil 84 is a pick-up coil 88 which is connected to a coaxial line, having an inner conductor 89 and an outer shield 90, which coaxial line transfers the radio-frequency energy to the electrodes to establish the field in the material. Positive plate voltage is applied to terminal 91 which is connected to the mid-point of the plate coil through a radio frequency choke coil 92. The mid-point of the grid coil is connected through a choke coil 93 and a resistor 94 to a ground 95 which is also connected to the negative terminal 96 of the plate voltage supply. A by-pass condenser 97 is connected from the mid-point of the grid coil to ground. The mid-point of a filament transformer secondary 98 is connected to ground through conductors 99 and 100, and switch 101. It will be seen that, by opening the switch 101, the cathodes will be disconnected from the ground, thus removing the cathode-plate voltage and stopping oscillations.

While "cathode-keying" of the oscillator is shown herein and is the preferred method, it is to be understood that any of the other well-known methods, such as plate circuit, power supply, or blocked-grid keying, may be used and are clearly within the scope of this invention. Since the switch need carry only direct currents of low value, the contact problem is not a serious one. The conductors 99 and 100 are carried in a shielded cable 104, which is grounded to minimize the possibility of radiation from any radio-frequency currents that may flow in said conductors. The switch shown schematically as element 101 in Fig. 6 comprises the contacts 55 and 64 of Figs. 1 and 2.

The coaxial line terminates in a load-end tuning circuit comprising a variable condenser 102 in series with an inductance coil 103 which is shunted across the electrodes 35 and 77, as shown.

Figure 7:
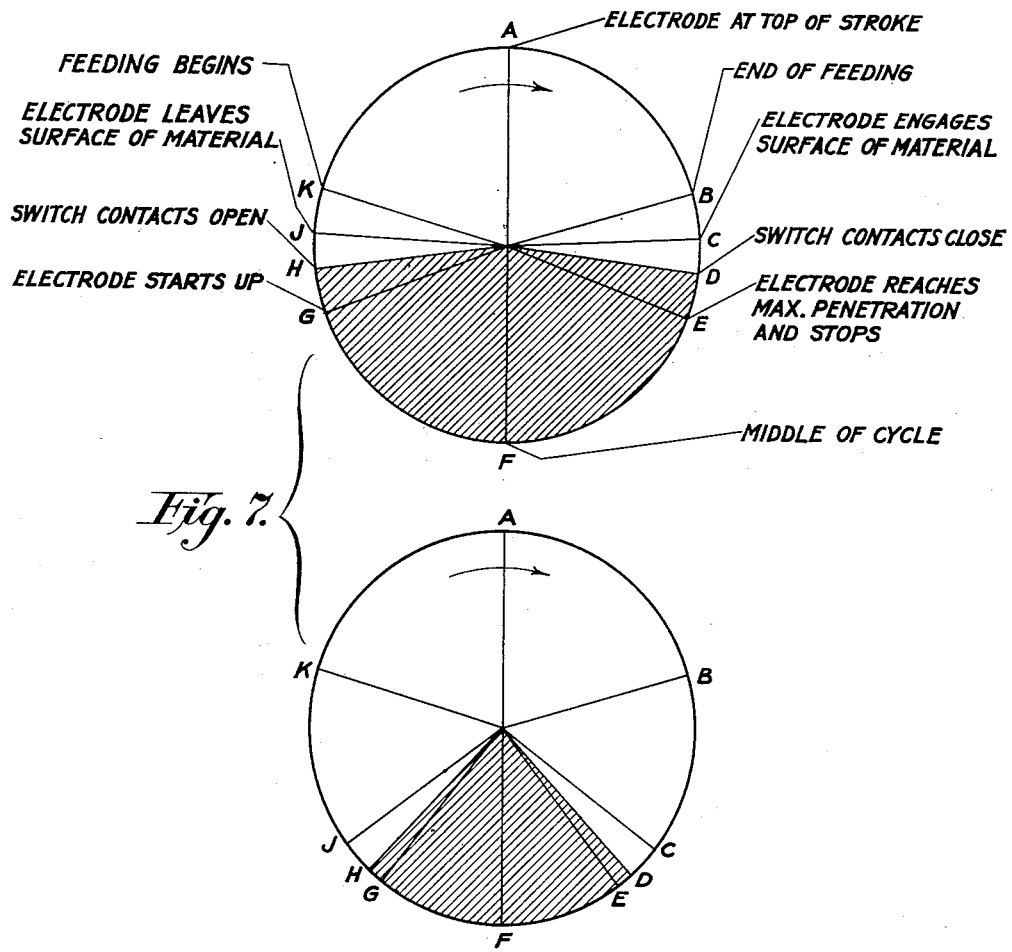
Fig. 7 is a schematic representation of the events taking place in a time cycle of one complete reciprocation of the electrode. Two cycles are shown; one for thin and the other for thick material.

In Fig. 7 are shown time-cycle diagrams for the machine. The lettered points about the circumferences indicate successive rotative positions of the eccentric pin 27 and also represent intervals of time proportional to the angle, for any constant shaft speed. Point A represents the condition in which the electrode 35 is in its maximum raised position with work being fed through the machine. Time is increasing clockwise and the electrode 35 is descending. At point B, the feeding of the material ceases but the electrode continues to descend. At point C, the electrode engages the surface of the material. The electrode continues its descent and, at D, the keying switch contacts 55 and 64 close to turn on the oscillator, and the bonding period begins. At E, the electrode finally comes to rest and has now penetrated the material to the proper maximum depth determined by the position of the arm 71 as set by the presser bar 46 in response to the thickness of the material. Bonding time is still going on from E to G, and F represents the mid-point of the cycle. At G, the electrode 35 begins its upward ascent and, at H, the keying switch contacts 55 and 64 open to turn off the oscillator and conclude the bonding period for the cycle. The electrode reaches the surface of the material at J and, at K, feeding begins. Finally, at A, the electrode 35 is again in its maximum raised position and the cycle is completed.

The position, vertically, of the presser 81, responsive to the thickness of the material thereunder, establishes the point at which the upper electrode 35 stops in its downward descent. Also, the presser position determines the amount of vertical movement of the upper switch contact 55 necessary to close said switch. For thick materials, the entire switch assembly, carried by the presser bar 46, is moved up closer to the crosshead 37 of the electrode bar. This movement compresses the spring 57 and moves contact 55 closer to contact 64. Thus, when the electrode bar descends from its top position, a shorter movement thereof, and hence a shorter time, is necessary to close said contacts and turn on the oscillator, as indicated by the earlier position of point D in the upper diagram, as compared with the lower diagram of Fig. 7. This clearly establishes a variation in oscillator "on" time dependent on the material thickness.

The two cycles shown are for different thickness conditions, the upper one being for thick material and the lower one being for thin material. It will be seen how the bonding times, indicated as the cross-hatched areas, depend upon the material thickness. Further, the percentage penetration is given by the ratio of arc CE to arc CF, and this is a constant for any one position of the pivot screw 72 in slot 73 regardless of the thickness variation.

How soon the switch contacts 55 and 64 close after the electrode 35 engages the surface of the material (represented in Fig. 7 by the arc CD), depends upon the adjustment of the contact 64 relative to the electrode bar. This is of considerable importance in securing the maximum available bonding time per cycle by utilizing for bonding substantially all the time that the electrode is in the material.

Figure 8:
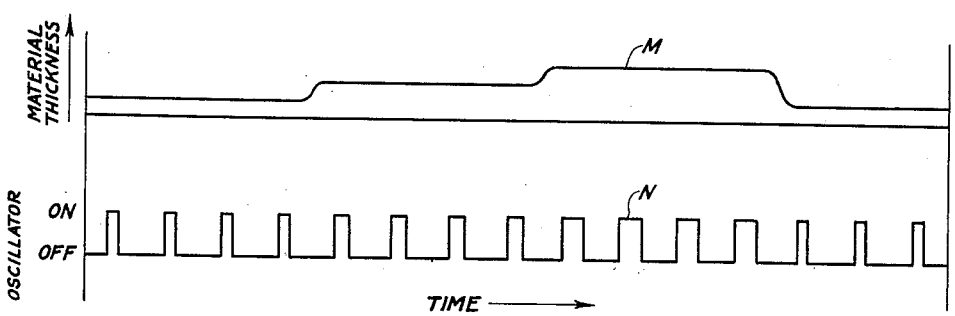
Fig. 8 is a schematic representation of the variations in the bonding time responsive to variations in the material thickness.

In Fig. 8 curve M indicates an assumed time variation of the thickness of the material being bonded. Curve N shows the "on" and "off" times of the oscillator provided by the mechanism according to the invention. It will be seen that, in effect, the system provides a pulse width modulation of the radio-frequency energy according to the material thickness encountered. In this manner, the average energy input to the material being bonded is automatically governed by the thickness itself and no special control of the feed rate, the frequency, or the magnitude of the radio-frequency field is necessary. Further, the oscillator is effective to supply the electrodes with radio-frequency energy only when the electrode 35 is penetrating the material and, thus, the cause of the adverse sparking is completely removed.

The foregoing description discloses what we deem to be a practical and efficient embodiment of the invention, and it should be understood that changes made in the arrangement, disposition and form of the parts may be varied without departing from the principles of the present invention as comprehended within the spirit and scope of the appended claims.

Having thus set forth the nature of the invention, what we claim herein is:

1. In an electronic seaming machine, a work support, an electrode, work feeding means for advancing work between said work-support and said electrode, a work-contacting presser operative independently of said electrode, switch means for establishing at periodic intervals a radio-frequency field in the work in the region of said electrode, said switch means having cooperating contacts operatively connected to said presser and to said electrode respectively, whereby the time duration of the radio-frequency field in each interval is varied in response to variations in the thickness of said work.

2. In an electronic seaming machine, a work-support, an electrode yieldingly opposed to said work-support, work-feeding means including a presser for advancing work between said work-support and said electrode, stop means carried by said presser and moved responsive to variations in the thickness of the work for limiting the penetration of the electrode into the work, switch means actuated by said electrode for establishing at periodic intervals a radio-frequency field in the work in the region of the electrode, said switch means being carried by said presser whereby its actuation is rendered responsive to variations in the thickness of the work for varying the time duration of the radio-frequency field in each interval.

3. In an electronic seaming machine, a reciprocatory electrode, work-feeding means including a work-contacting presser, means for reciprocating said electrode intermittently to engage work advanced by said work-feeding means, means actuated by movement of said presser for limiting the maximum penetration of said electrode into the work responsively to thickness of said work, and switch means carried by said presser and actuated by said electrode for establishing a radio frequency field in the region of the work engaged by said electrode for a time responsive to the thickness of said work.

4. In an electronic seaming machine, a reciprocatory electrode, work-feeding means, means for reciprocating said electrode intermittently to engage work advanced by said work-feeding means, a thickness sensing element mounted for work-responsive movement relative to said electrode, and for engaging said work in a region adjacent to the electrode, electrical contacts carried by said sensing element, and means operative responsively to the reciprocations of said electrode for causing actuation of said contacts, whereby the length of time during which said contacts are closed is controlled by the thickness of said work.

5. In an electronic seaming machine, a reciprocatory electrode, work-feeding means including a work-contacting presser, means for reciprocating said electrode intermittently to engage work advanced by said work-feeding means, oscillator means for establishing a radio-frequency field in the region of the work engaged by said electrode, adjustable stop means actuated by movement of said presser responsive to the thickness of said work for limiting the maximum penetration of said electrode into said work, and adjustable switch means carried by said presser and actuated by said electrode responsive to the thickness of said work for limiting the time during which said radio-frequency field is effective.

6. In an electronic seaming machine, a reciprocatory electrode, work-feeding means, means for reciprocating said electrode to intermittently engage work advanced by said work feeding means, oscillator means for establishing a radio-frequency field in the region of the work engaged by said electrode, means movable relative to said electrode for sensing the thickness of said work in the region of the work engaged by said electrode, means responsive to said sensing means for limiting the penetration of said electrode into the work for each reciprocation, and means responsive to said sensing means for turning on said oscillator means only during engagement of the electrode with the work and for a time duration proportional to the thickness of said work.

7. In an electronic seaming machine, a work-support, an electrode movable towards and away from said work-support, work-feeding means for advancing the work between said work-support and said electrode, oscillator means including said electrode for establishing a radio-frequency field in the work in the region of said electrode, a work-thickness sensing means movable relative to said electrode for sensing the thickness of the work in the region of said electrode, variable stop means responsive to said work-thickness sensing means for limiting the maximum movement of said electrode towards said work-support, and means responsive to said work-thickness sensing means for rendering said oscillator means effective only when said electrode is in engagement with said work and then for a time duration proportion to the thickness of said work.

8. A machine for uniformly heating material of varying thickness, which material is advanced progressively through a radio-frequency field of substantially constant intensity, comprising electrodes, an oscillator for establishing a radio-frequency field between said electrodes, work-feeding means for advancing the work progressively between said electrodes, switch means operatively connected to said work-feeding means for turning on and off said oscillator at regular periodic intervals, and thickness-determining means independent of said electrodes and in contact with said work in the region of the radio-frequency field for modifying the operation of said switch means for varying the time duration of the radio-frequency field in each interval in accordance with the thickness of said work in the region of the radio-frequency field.

9. In an electronic seaming machine, a work-support, an electrode, work-feeding means for advancing work between said work-support and said electrode, means including said electrode for establishing a radio-frequency field in the work, a switch operatively connected to said work feeding means for turning on and off said radio-frequency field at periodic intervals, an element movable independently of said electrode and responsively to variations in the thickness of the work in the region of the electrode to modify the operation of said switch so as to increase the time duration of the radio-frequency field in each interval with increasing thickness of the work.

10. In an electronic seaming machine, an electrode, means for advancing work past said electrode, spring means for urging said electrode into engagement with said work, cam means for periodically lifting said electrode away from said work, presser means movable independently of said electrode and in contact with the work in the region of the electrode, a switch mechanism mounted on said presser means, and a switch operator operatively connected to said electrode for causing operation of said switch mechanism in timed relation with the periodic lift of said electrode.

11. In an electronic seaming machine, an electrode, means for advancing work past said electrode, spring means for continuously urging said electrode into engagement with said work, cam means for periodically lifting said electrode away from said work, presser means movable independently of said electrode and in contact with the work in the region of the electrode, a switch operator connected to said electrode, a switch mechanism mounted on said presser and operatively presented to said switch operator whereby movement of said presser in response to changes in the thickness of the work alters the time during which the switch mechanism remains closed for each electrode reciprocation period.

12. A machine for electronically seaming dielectric material of varying thickness, having, in combination, spaced electrodes yieldingly urged towards each other, an electronic oscillator electrically connected thereto for establishing a radio-frequency field between said electrodes, switch mechanism for turning said oscillator on and off periodically, and presser mechanism operative independently of said electrodes and responsively to the thickness of said dielectric material for modifying said switch mechanism so as to change the time during which said oscillator is turned on in each period in accordance with the variation in said thickness.

13. In an electronic seaming machine having a reciprocatory electrode electrically connected to a radio-frequency oscillator, and a presser for holding material to be seamed against a feed wheel, an oscillator switch comprising a tubular casing, a movable contact carried by said casing, a portion depending from said casing, a fixed contact carried by said depending portion; said switch casing, including said depending portion, being mounted on said presser so that it is variably positioned vertically in accordance with the thickness of the material under said presser, and means associated with said reciprocatory electrode for operating said movable contact relative to said switch casing for closing and opening said switch contacts in timed relation with the electrode reciprocations.

14. In a machine for seaming material by the application thereto of a radio-frequency electric field, an arm shaft, an eccentric carried by said arm shaft, an electrode bar, a spring for pressing said electrode bar downwardly, a cross-head secured to one end of said electrode bar and operatively connected to said eccentric to periodically lift said electrode bar against the pressure of said spring, an electrode secured to the opposite end of said electrode bar, a presser and a feed wheel for feeding the material past the electrode, a switch comprising a casing carried by said presser, a plunger mounted for vertical reciprocation within said casing, a first contact mounted for movement with said plunger, a second contact fixed relative to said casing, and a cap member resiliently coupled to said plunger and operatively connected to said cross-head whereby, for each revolution of said arm shaft, said first and second contacts make and break.

15. In an electronic seaming machine having a reciprocatory electrode electrically connected to a radio-frequency oscillator, and a movable presser cooperating with a lower feeding mechanism for advancing material past the electrode, the combination of an oscillator switch comprising a tubular casing carried by said presser, a contact yieldingly mounted for movement relative to said casing, a second contact fixed to said casing, and mechanism associated with said reciprocatory electrode for operating said movable contact relative to said fixed contact.

16. In an electronic seaming machine having a reciprocatory electrode electrically connected to a radio-frequency oscillator, and a movable presser cooperating with a lower feeding mechanism for advancing material past the electrode, the combination of an oscillator switch comprising a tubular casing carried by said presser, a contact yieldingly mounted for movement relative to said casing, a second contact fixed to said casing, and a member connected to said electrode for actuating said movable contact during each reciprocation of said electrode.

17. An electronic seaming machine having in combination spaced electrodes movable towards and away from each other, a radio-frequency oscillator electrically connected to said electrodes, feeding mechanism including a presser for intermittently advancing material between said electrodes, said presser being yieldingly mounted for movement in response to variations in the thickness of the material under the presser, a switch for turning on and off said oscillator and carried by said presser, an electrode bar carrying one of said electrodes, means for reciprocating said bar relative to said presser, and a member operatively connected to said bar for operating said switch.

HANS HACKLANDER.
JOHN A. HERR.

REFERENCES CITED

The following references are of record in the file of this patent:

UNITED STATES PATENTS

| Number | Name | Date |
| --- | --- | --- |
| 2,317,281 | Linquist | Apr. 20, 1943 |
| 2,401,991 | Walton et al. | June 11, 1946 |
| 2,422,525 | Brown | June 17, 1947 |
| 2,432,412 | Hacklander | Dec. 9, 1947 |
| 2,453,680 | Sweeny | Nov. 9, 1948 |
| 2,457,498 | Russell | Dec. 28, 1948 |
| 2,458,059 | Christensen et al. | Jan. 4, 1949 |
| 2,473,143 | Graham et al. | June 14, 1949 |
| 2,477,040 | Brown et al. | July 26, 1949 |

OTHER REFERENCES

Wireless World, January 1945, page 29.